United States Patent

Haas, Sen. et al.

[11] Patent Number: 6,102,190
[45] Date of Patent: Aug. 15, 2000

[54] DEVICE FOR INTERMITTENTLY TRANSPORTING OBJECTS, IN PARTICULAR COATED WAFER SHEETS OR FILLED WAFER BLOCKS

[75] Inventors: Franz Haas, Sen., Vienna; Johann Haas, Klosterneuburg; Erich Koletnik, Klosterneuburg/Kierling, all of Austria

[73] Assignee: Franz Haas Waffelmaschinen-Industrie Aktiengesellschaft, Vienna, Austria

[21] Appl. No.: 09/202,363

[22] PCT Filed: Jun. 19, 1997

[86] PCT No.: PCT/AT97/00134

§ 371 Date: Dec. 10, 1998

§ 102(e) Date: Dec. 10, 1998

[87] PCT Pub. No.: WO97/49290

PCT Pub. Date: Dec. 31, 1997

[30] Foreign Application Priority Data

Jun. 25, 1996 [AT] Austria ..................... 1121/96

[51] Int. Cl.[7] .................................................. B65G 47/74
[52] U.S. Cl. ................. 198/633; 198/463.4; 198/459.6; 198/419.3; 198/360
[58] Field of Search ................ 198/633, 463.4, 198/459.6, 419.3, 360

[56] References Cited

U.S. PATENT DOCUMENTS 4,533,037  8/1985  Kerr ............................. 198/499
4,553,660  11/1985  Bennett et al. ................. 198/532

FOREIGN PATENT DOCUMENTS 29 13 042  10/1979  Germany .
35 05 596   8/1985  Germany .
36 30 895   3/1988  Germany .

Primary Examiner—Joseph E. Valenza
Assistant Examiner—Jeffrey A. Shapiro
Attorney, Agent, or Firm—Herbert Dubno

[57] ABSTRACT

Device for intermittently transporting objects, in particular coated wafer sheets or filled wafer blocks. At least one stop (5) that can be lowered below a transport plane is mounted downstream of a device (2) that pushes the objects (1) forward in the transport plane. The stop (5) has a bearing surface which is associated to the front face of the objects (1) and can be moved back and forth between an upper position in which it projects upwards with its bearing surface above the transport plane and a lower position in which it is lowered below the transport plane. At least one scraper (12, 13) associated to the bearing surface is arranged along the path of displacement of the bearing surface. The stop (5) consists of a moulded body (7) that be moved up and down and of a bearing surface that can be moved in relation to the moulded body (7) between a work position associated to the front face of the objects (1) and a rest position removed therefrom. The bearing surface is formed by a belt (8) which can be moved at least along the front face of the moulded body (7) which faces the front side of the objects (1).

6 Claims, 2 Drawing Sheets

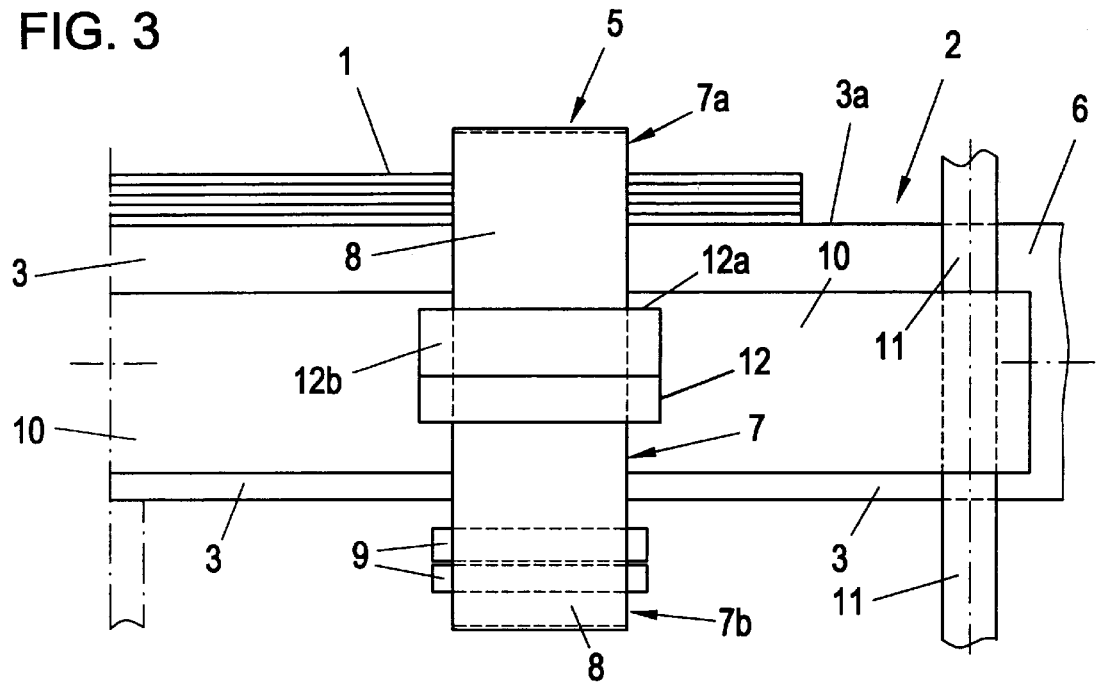
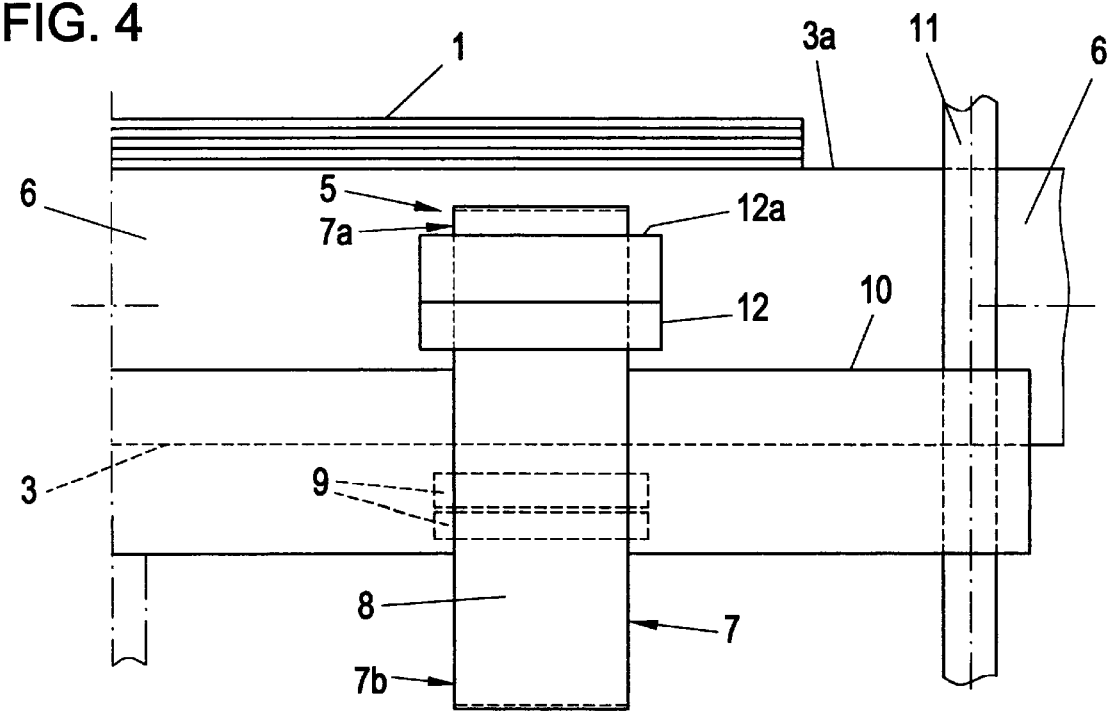

DEVICE FOR INTERMITTENTLY TRANSPORTING OBJECTS, IN PARTICULAR COATED WAFER SHEETS OR FILLED WAFER BLOCKS

BACKGROUND OF THE INVENTION

The invention generally relates to a device for the transport of objects, whereby the objects are pushed one after the other on a transport plane towards a sinkable stop, which stops each object for a short time, and after a predetermined time interval is lowered, in order to discharge the respective object for further transportation. In this device the intermittent lifting and lowering motions of the stop determine the time, respectively space intervals between objects in direct succession.

In particular the invention relates to a device for the intermittent transport of objects, whereby soft mass layers arranged on their surface or inside them reach up to their frontal sides and for this reason, when the objects are arrested by the stop, they can get stuck with their frontal sides to the bearing surface of the same. Such objects are for instance wafer sheets coated on their upper side with pasty or creamy masses which have not yet hardened, or wafer blocks filled with such masses, such as produced and intermittently transported in plants for the industrial production of filled two-layer or multiple-layer wafers, in the industry producing baked goods, respectively baked wafer items, respectively sweets.

STATE OF THE ART

From the industry producing baked goods, respectively baked wafer goods, respectively sweets, continuously working production installations for the industrial production of filled, two-layer or multiple-layer wafers are known. In the separate sections of these production installations wafer sheets are produced from wafer dough and one part of the baked wafer sheets is coated on the upper side with an edible cream, while the rest of the baked wafer sheets remains uncoated. The coated and uncoated wafer sheets are stacked on top of each other, thereby being joined to two-layer or multilayer wafer blocks filled with cream, which are cooled for the hardening of the cream, and later as cooled wafer blocks are cut into small, filled wafers.

Within such a production installation, the wafer sheets and the wafer blocks made thereof are continuously transported from one section of the production installation to the next section, thereby being adjusted to the respective work rhythm of the following production section. This happens mostly by means of a device for the intermittent transport of these objects, which is integrated in a production section and adjusts the intermittent transport of these objects to the work rhythm of the of the following production section. Within such a device, each object is moved in transport direction, by means of a work machine of the respective production section, or by means of its own transport device, until it reaches a sinkable stop, is arrested by this stop, and after the lowering of the stop is transferred at an adjusted work rhythm to the following production section.

A known device for the intermittent transport of objects comprises a transport device advancing the objects in transport direction on a transport plane, downstream of which in transport direction a sinkable stop is provided with a bearing surface for the frontal side of the objects. The stop is designed as a tongue, which is vertically moved up and down between two stationary scrapers arranged below the transport level and diagonally inclined downwards. The stop is moved back and forth by a mechanism, between an upper position wherein it projects with its bearing surface above the transport level, and a lower position wherein it is lowered below the transport level. While it is lowered, the stop slides along the two scrapers with its frontal and its rear sides, until its upper edge is lowered below the two scrapers. Thereby cream residues stuck to the bearing surface arranged on the front side of the stop are scraped off by the upwards pointing frontal side of the front stop and transferred to the rear scraper. In time cream residues collect and build up on both scrapers, so that when the stop is lifted a portion of the cream residues can be transferred back to the stop surface. In order to prevent that, the scrapers are cleaned from time to time. Since for this purpose not only that part of the production line wherein the intermittent transport device is integrated, but the entire production installation has to be stopped, this cleaning is performed only during planned production interruptions, e.g. at the end of a work day.

In its upper position the stop projects over the transport level with its bearing surface and interrupts the advance of the respective object. The latter is advanced by the transport device in transport direction until its front end projects beyond the transport device and is pressed against the bearing surface of the stop. The object lies then with its front end against the bearing surface of the stop and the portion of cream coming in contact with the bearing surface form an adhesive bond, which has to be destroyed while the stop is lowered, without damaging the object.

During the lowering of the stop from its upper position, it shears along the frontal side of the object. Thereby shearing forces are generated in the adhesive bond between the frontal side of the objects and the bearing surface of the stop, which loosen this bond and subject the frontal side of the object projecting beyond the transport device to bending stress. This can lead to breaks in the very brittle and easily breakable wafer sheets, respectively wafer blocks. After the adhesive bond was loosened, the stop dips below the transport level and releases the object, so that the latter can be further advanced by the transport device.

SUMMARY OF THE INVENTION

It is the object of the invention to eliminate these drawbacks.

In order to solve this problem, a device for the intermittent transport of objects, particularly of cream-coated wafer sheets or cream-filled wafer blocks or the like is proposed. In this device at least one stop having a bearing surface assigned to the frontal side of the objects, which can be lowered below the transport level, is arranged downstream of a transport device advancing the objects on a transport plane in transport direction. The stop can be moved back and forth by a mechanism, between an upper position wherein it projects with its bearing surface above the transport plane, and a lower position wherein it is lowered below the transport plane. Along the motion path of the bearing surface at least one scraper is associated therewith.

According to the invention this device for the intermittent transport of objects is characterized in that the stop consists of a molded body, which can be moved up and down by a mechanism, and of a bearing surface movable in relation thereto, which can be moved from a work position associated with the advancing frontal side of the objects to a rest position removed therefrom, and which is formed by a belt which can be moved at least along the front face of the molded body facing the front side of the objects.

This construction makes possible to loosen the adhesive bond which occurs always between the bearing surface of the stop and the front side of the object, in that the belt arranged between the advancing front side of the object and the front face of the molded body is moved along the outside of the molded body, from its work position its remote rest position. This motion used for detaching the bearing surface from the advancing front side of the object can be selected independently form the work motions of the molded body. In the construction of the stop proposed by the invention, the molded body moved up and down by the mechanism takes over the support function of the stop, while the bearing surface is designed to be movable in relation to the molded body.

Due to the construction of the invention, in the case of objects with sticky front sides the detachment of the stop from the front side of the object is facilitated. In the case of easily breakable objects with sticky front sides, the bending stress caused by the detachment of the stop, and thereby the existing danger of breaking the objects during the lowering of the stop, is reduced, respectively eliminated in some cases.

According to a further feature of the invention, the belt can rest against the outer side of the molded body, surrounds the former at least partially and with a partial area forms the bearing surface of the stop.

Due to the movement of the belt, the mass residues which adhered to the partial area of the belt forming the movable bearing surface during the loosening of the adhesive bond, travel together with this partial area along the outside of the molded body until they reach the rest position of the belt, where they can be scraped off from the belt, respectively from the movable bearing surface.

According to a further feature of the invention, the movable bearing surface can be designed as a part of a movable belt loop covering the front and the rear side of the molded body, which can be moved with its partial area forming the bearing surface movable from its work position, arranged on the front face of the molded body, to its rest position, arranged at the rear side of the molded body.

According to a further feature of the invention, the movable belt loop can be stationarily fixed below the transport plane, between the device advancing the objects and the motion path of the molded body and moved up and down through the motions of the molded body, whereby the partial area of the belt loop forming the movable bearing surface can be moved through the lowering of the molded body from its work position, above the upper side of the molded body, in transport direction until it reaches the rest position, and through the lifting of the molded body it can be moved from its rest position against transport direction, above the upper side of the molded body, until it reaches the work position.

According to a further feature of the invention, along the motion path of the partial area of the belt forming the moving bearing surface, at least one stationary scraper is provided, which is associated with the bearing surface moving from the work position into the rest position.

In this construction the movable bearing surface is moved with lowering motion of the molded body from the work position in the rest position, and thereby along the stationary scraper, which scraps off the stuck mass residues from the bearing surface.

According to a further feature of the invention, along the motion path of the partial area of the belt forming the movable bearing surface at least one movable scraper can be provided, which is associated with the movable bearing surface, moving from the rest position into the work position.

In this construction at first the movable bearing surface is moved with the lowering motion of the molded body from the work position into the rest position, passing by the movable scraper which is also in its rest position. The movable scraper gets into action only during the return motion triggered by the lifting motion of the molded body, during which it scrapes off the mass residues stuck to the movable bearing surface in the opposite direction with respect to the motion of the belt.

The movable scraper can be used in addition to the stationary scraper, so that during the return motion of the belt it scrapes off and completely removes from the movable bearing surface the mass residues possibly entrained by the belt while passing the stationary scraper.

BRIEF DESCRIPTION OF THE DRAWING

In the following the invention is closer described with the aid of an embodiment example represented in the drawing. The drawing shows.

DESCRIPTION OF THE EMBODIMENT EXAMPLES

Figure 1:
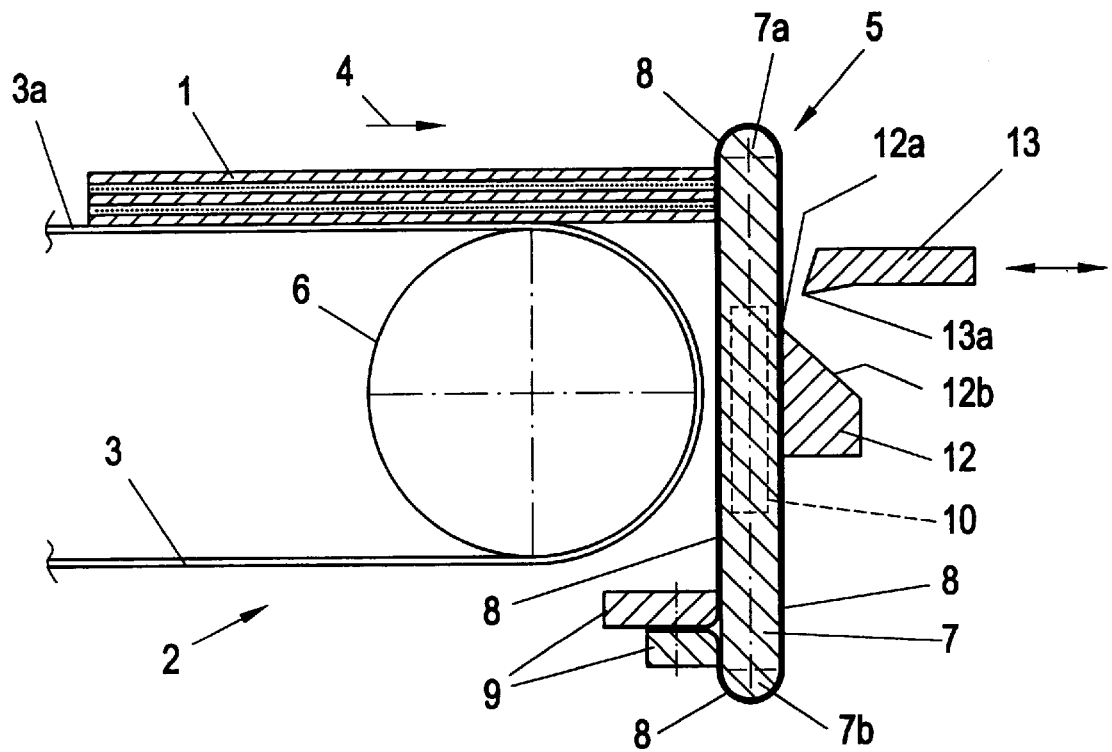
FIG. 1 a longitudinal section through a device for the intermittent transport of objects in the area with a stop cooperating with a stationary and a movable scraper, when the stop is raised.

The drawing represents a device for the intermittent transport of objects, which conveys the rectangular wafer blocks 1 filled with a spread in a predetermined work rhythm to a subsequently arranged production section (not represented) of a production installation. In the represented production section, the device 2 advancing the objects 1 is a transport device equipped with an endless transport belt 3, which with the upper face 3a of its transport belt 3 forms the transport plane for the wafer blocks 1 and advances the wafer blocks 1 in the transport direction 4. The two stops 5 are arranged transversely to the transport direction 4, one next to each other, each close to a lateral margin of the motion path of the wafer blocks 1, and are together vertically lifted, respectively lowered.

The device advancing the objects can be also formed by a work machine of a production section of the production installation or also by a transport device of a different construction. The sinkable stops are then arranged immediately downstream of the respective work machine or of the respective transport device, and can be integrated in a separate production section arranged immediately downstream of the respective work machine or the respective transport device, or in the production section of the respective work machine or transport device themselves.

The endless transport belt 3 runs over a frontal guide roller 6 supported in a stationary frame (not represented), faced by the front sides of the two stops 5.

Each of the stops 5 consists of a molded body 7 and a belt 8 movable in relation therewith. The molded body 7 is designed as a vertically arranged flat plate, which is rounded at its upper edge 7a and its lower edge 7b and over whose outer side a belt 8 is laid about as a belt loop. Underneath the guide roller 6, between the guide roller 6 and the molded body 7, the belt loop is fixed with its belt ends in a holding device 9 on the frame. The belt 8 extends away from the holding device 9, upwards along the front face of the molded body 7, over its upper edge 7a towards its rear face and downwards along the same, and over its lower edge 7b back again to its front face and along the same back again upwards to the holding device 9.

A partial area of the belt loop forms a movable bearing surface, which due to a relative motion of the belt loop along the outer side of the molded body, can be displaced from a work position assigned to the front side of the wafer blocks 1, at the front face of the molded body 7, to a rest position removed from the front side of the wafer blocks 1, at the rear face of the molded body 7.

The two molded bodies 7 are fastened on a horizontal crossbeam 10, which is arranged transversely to the transport direction 4 and is connected laterally, outside the motion path of the wafer blocks 1, with vertical conveying members 11. These are part of a motion mechanism which moves the two stops 5 back and forth between an upper position and a lower position. The vertical conveying members 11 can be threaded spindles engaged with the crossbeam 10 via threaded sleeves, which can be set into rotation about their own rotation axes for the vertical displacement of the stops 5.

In the upper position of the stops 5, they project upwards with the upper edge 7a of their molded bodies 7 and with the movable bearing surfaces of their belts 8 over the motion path of the wafer blocks 1. In this position of the stops 5, the transport belt 3 pushes a wafer block 1 forward in the transport direction 4, until it is stopped by the two stops 5. Thereby the wafer block 1 pushes with its front side against both movable bearing surfaces, each of them being in the working position, and presses the belts 8 of the stops 5 against the front faces of the molded bodies 7.

If the stopped wafer block 1 is to be transported further by transport belt 3 in the transport direction 4, then both stops 5 are lowered. This can occur after a predetermined time interval, or due to a control signal of the subsequent production section or due to the control system of the production installation.

For the lowering of the stops 5, the crossbeam 10 is moved downwards by the motion mechanism. Thereby each molded body 7 is moved downwards within the surrounding belt loop and moves the same also downwards. Since this belt loop is fixed at one point of its circumference via the holding device 9 mounted on the frame, the belt loop continues to move around the molded body 7 in the transport direction 4. Thereby the partial area of the belt loop forming the movable bearing surface is detached in a peeling motion from the advancing frontal side of the wafer block 1 and moved over the upper edge 7a of the molded body 7 into its rest position. During this peeling motion, the wafer block 1 is kept back from the respective stop 5, until the peeling motion is completed. During the detachment of the moving bearing surface from the frontal side of the wafer block 1, the latter lies with its frontal side against the part of the bearing surface which has yet not been peeled off and is supported via this part of the movable bearing surface on the front face of the molded body 7.

In the lower position of the stops 5, the molded bodies 7 are lowered with their upper edges 7a and the belt loops below the motion path of the wafer blocks 1 and the respective partial areas of the belts 8 forming the movable bearing surfaces have reached their rest position at the rear side of the respective molded bodies 7.

If the wafer block 1 has passed the lowered stops 5 with its rear side, then the two stops 5 are lifted from their lower position to their upper position. While the stops 5 are lifted, the molded bodies 7 move with the belt loops upwards, and the belt loops revolve around the molded bodies in motion in a direction opposite to the transport direction 4. Thereby the partial areas of the two belts 8 forming the movable bearing surfaces are moved from their rest positions, at the rear side of the respective molded body 7, back into their work positions, at the frontal face of the respective molded body 7.

At each stop 5, underneath the transport level formed by the upper face 3a of the transport belt 3, a stationary scraper 12 is provided, which is arranged at the rear side of the respective molded body 7 and fixed to the frame. The scraper 12 has an upper scraping edge 12a, which is arranged close to the rear side of the molded body 7, and which from outside the belt 8 scrapes off the cream residues stuck to the belt, when the belt 8 running between the rear side of the molded body 7 and the scraper 12 revolves around the molded body 7 in the transport direction 4. The cream residues scraped off the outside of the belt are transferred to a diagonally downwards inclined surface 12b of the scraper 12, which starts from the upper scraping edge 12a. When the stops 5 are lowered, the crossbeam 10 is moved downwards so far the respective partial areas of the belts 8 forming the movable bearing surfaces are moved past the scraping edge 12a of the stationary scraper 12 due to the revolving motion of the belt loops. The stationary scrapers 12 are arranged along the motion path of the movable bearing surfaces, each between the work position and the rest position of the respective movable bearing surfaces.

Figure 2:
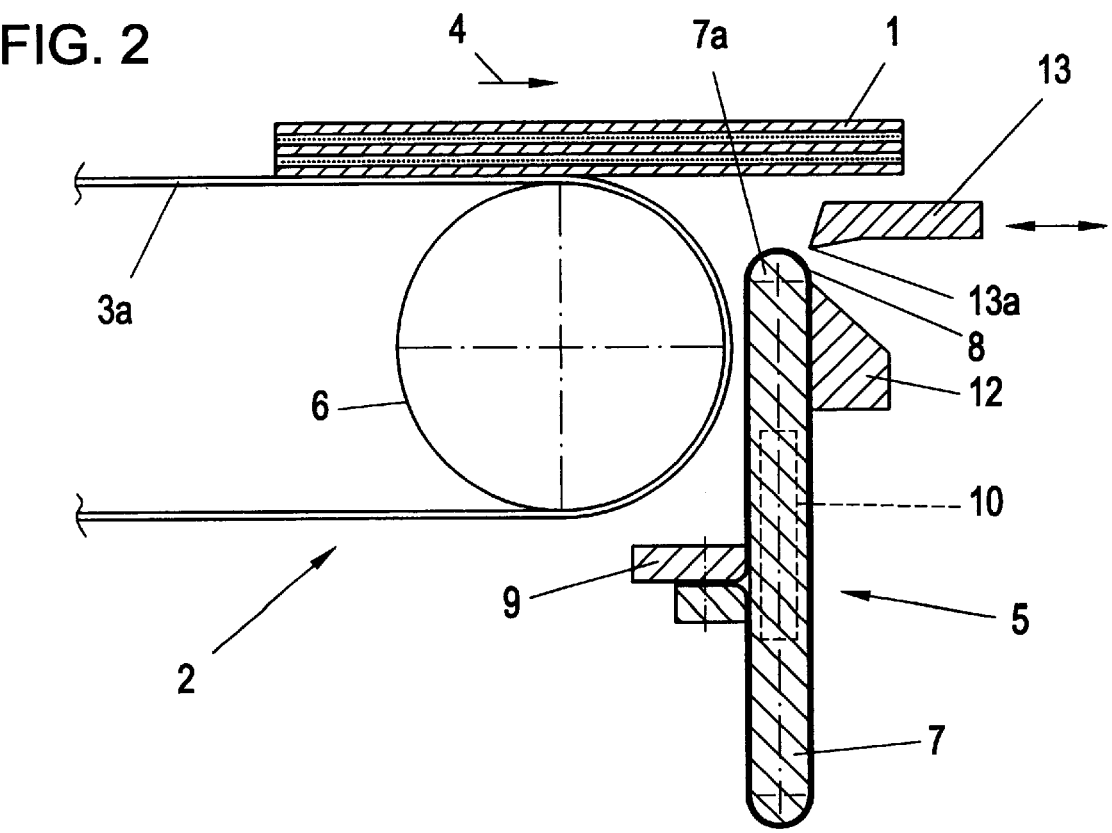
FIG. 2 a longitudinal section through the device of FIG. 1, when the stop is lowered, FIG. 3 a frontal view of FIG. 1 without movable scraper, and FIG. 4 a frontal view of FIG. 2 without movable scraper.

Practically it can not be avoided that the cream residuals build up on the upper scraping edge 12a and are again entrained by the belt 9 while the stop 5 is raised. In order to prevent that, it is possible to provide below the transport level for the wafer blocks 1 a movable scraper 13 in addition to the stationary scraper 12, or even instead of the stationary scraper 12. The movable scraper 13 can abe arranged to be movable or swingable against the transport direction 4, back and forth between a work position (FIG. 2) and a rest position (FIG. 1). The movable scraper 13 has a lower scraping edge 13a facing the rear side of the molded body 7, which in the work position is located close to the rear side of the molded body 7. In the work position of the movable scraper 13, cream residuals stuck to the outside of the belt 8 are scraped off at its lower scraping edge 13a, when the belt resting against the outside of the molded body 7 revolves between the rear side of the molded body 7 and the movable scraper 13 in a direction opposite to the transport direction 4. The movable scrapers 13 are arranged along the motion path of the movable bearing surfaces, also each between the work position and the rest position of the respective movable bearing surface.

In contrast to the stationary scrapers 12, which act when the molded bodies are lowered, the movable scrapers 13 are in use when the molding bodies 7 are raised.

What is claimed is:

1. Device for the intermittent transport of objects (1), particularly of wafer sheets coated with cream or wafer block filled with cream or the like, wherein at least one stop (5) which can be lowered below the transport plane is arranged downstream of a device (2) advancing the objects (1) in transport direction (4), which has a bearing surface associated with the advancing frontal side of the objects (1)

and which is moved back and forth by a mechanism between an upper position, wherein it projects upwards with its bearing surface over the transport plane, and a lower position, wherein it is lowered below the transport plane, whereby along the motion path of the bearing surface at least one scraper (12, 13) assigned thereto is provided, characterized in that the stop (5) consists of a molded body (7) movable up and down by a mechanism and of a bearing surface movable in relation thereto, which can be moved from a work position associated with the advancing front side of the objects (1) to a rest position removed therefrom, and is made of a belt (8) movable at least along the front face of the molded body (7) facing the advancing front side of the objects (1).

2. Device according to claim 1, characterized in that the belt (8) rests against the outer side of the molded body (7), surrounding the same at least partially and with a partial area forms the movable bearing surface.

3. Device according to claim 1, characterized in that the movable bearing surface is designed as a part of a movable belt loop covering the molded body (7) on its front face and its rear face, which with its partial area forming the movable bearing surface can be moved from its work position, located at the front face of the molded body (7), to its rest position at the rear side of the molded body (7).

4. Device according to claim 3, characterized in that the movable belt loop is stationarily fixed underneath the transport plane, between the device (2) advancing the objects (1) and the motion path of the molded body (7), and can be moved up and down through the motions of the molded body (7), whereby the partial area of the belt loop forming the movable bearing surface is movable due to the lowering of the molded body (7) away from the work position over the upper side of the molded body (7) in transport direction (4) into the rest position, and due to the raising of the molded body (7) is movable away against the transport direction (4) over the upper side of the molded body (7) into the work position.

5. Device according to claim 1, characterized in that along the motion path of the partial area of the belt (8) forming the bearing surface at least one stationary scraper (12) is provided, which is associated with the bearing surface moving from the work position to the rest position.

6. Device according to claim 1, characterized in that along the motion path of the partial area of the belt (8) forming the bearing surface, at least one movable scraper (13) is provided, which is associated with the movable bearing surface moving from the rest position to the work position.

* * * * *